US012650322B2

(12) United States Patent
Bryant

(10) Patent No.: US 12,650,322 B2
(45) Date of Patent: Jun. 9, 2026

(54) FUNCTIONAL SAFETY HIGH-SPEED FAIL-SAFE COUNTER MODULE

(71) Applicant: Siemens Aktiengesellschaft, Munich (DE)

(72) Inventor: William Keith Bryant, Johnson City, TN (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 694 days.

(21) Appl. No.: 18/040,575

(22) PCT Filed: Aug. 19, 2020

(86) PCT No.: PCT/US2020/046964
§ 371 (c)(1),
(2) Date: Feb. 3, 2023

(87) PCT Pub. No.: WO2022/039733
PCT Pub. Date: Feb. 24, 2022

(65) Prior Publication Data
US 2023/0280190 A1 Sep. 7, 2023

(51) Int. Cl.
*G01D 5/00* (2006.01)
*G01D 5/244* (2006.01)

(52) U.S. Cl.
CPC ................................ *G01D 5/24457* (2013.01)

(58) Field of Classification Search
CPC ......... H03K 2/38; H03K 21/40; G06M 1/101; G06M 7/00; G06M 9/00; B65H 2220/03;
(Continued)

(56) References Cited

U.S. PATENT DOCUMENTS

| | | | |
|---|---|---|---|
| 4,477,919 A | 10/1984 | Borras et al. | |
| 4,726,024 A | 2/1988 | Guziak | |

(Continued)

FOREIGN PATENT DOCUMENTS

| | | |
|---|---|---|
| CN | 1274113 A | 11/2000 |
| CN | 101022275 A | 8/2007 |

(Continued)

OTHER PUBLICATIONS

Chen Jing et al, "PLC high-speed counter-based weight falling speed measurement method research", "Journal of Testing Technology", vol. 30, No. 5, pp. 438-441, Oct. 30, 2016.

(Continued)

*Primary Examiner* — Tuan T Lam

(57) ABSTRACT

A fail-safe counter module comprises a controller including a processor and a memory and circuitry for fail-safe counting. The fail-safe counter module further comprises computer-readable safety rating support code stored in the memory which, when executed by the processor, causes the controller to provide safety rating to International Standard levels such as Safety Integrity Level (SIL) 3, Category (CAT) 4, Performance Level (PL) e. The fail-safe counter module further comprises computer-readable "Safety Monitoring" functions code stored in the memory which, when executed by the processor, causes the controller to work with a user interface to select and configure the "Safety Monitoring" functions. The fail-safe counter module is a functional safety-rated device with an expected rating for SIL 3, CAT 4, PL e applications and is engineered to calculate position and/or speed utilizing an external quadrature encoder sensor that generates waveforms which permits counting of specific electrical pulses.

18 Claims, 17 Drawing Sheets

(58) Field of Classification Search
CPC .............. G01D 5/2457; G01D 5/24404; G06F
2201/88
See application file for complete search history.

(56) References Cited

U.S. PATENT DOCUMENTS

| | | |
|---|---|---|
| 6,065,130 A | 5/2000 | Glitho |
| 2006/0072251 A1 | 4/2006 | Ross et al. |
| 2007/0152861 A1 | 7/2007 | Stanley et al. |
| 2009/0164162 A1 | 6/2009 | Sadayuki et al. |
| 2009/0187372 A1 | 7/2009 | Mienkina |
| 2011/0098829 A1 | 4/2011 | Koepcke et al. |
| 2013/0074023 A1 | 3/2013 | Millendorf |
| 2014/0119489 A1 | 5/2014 | Kato |
| 2019/0248625 A1* | 8/2019 | Mustonen ............. B66B 5/0037 |

FOREIGN PATENT DOCUMENTS

| | | |
|---|---|---|
| CN | 102084305 A | 6/2011 |
| CN | 103293476 A | 9/2013 |
| CN | 106124966 A | 11/2016 |
| CN | 107112999 A | 8/2017 |
| EP | 0355559 A1 | 2/1990 |
| EP | 3312567 A1 | 4/2018 |
| GB | 1033102 A | 6/1966 |
| JP | S56120225 A | 9/1981 |
| WO | 2007137625 A1 | 12/2007 |
| WO | WO2007/137625 * | 12/2007 |

OTHER PUBLICATIONS

Wang Haiyan et al:"Programmable Controller and Industrial Control Network", Sep. 30, 2015.

* cited by examiner

A — 305(1)    B — 305(2)    C — 305(3)

205    205    205

Output Image Register — 405

| | Bit 7 | Bit 6 | Bit 5 | Bit 4 | Bit 3 | Bit 2 | Bit 1 | Bit 0 |
|---|---|---|---|---|---|---|---|---|
| Byte 0 | Reset Safe Direction | Reset Safe Stop | Reserved | Reset Safe Speed | Reserved | Reserved | Reset Other Events | Open SW Gate |
| Byte 1 | Safe Direction | Enable Safe Direction | Enable Safe Stop | Enable Safe Speed | Reserved | Set Start Value | Reserved | Reserved |
| Byte 2-5 | PROFIsafe Trailer (V2.4) | | | | | | | |
| Byte 2-6 | PROFIsafe Trailer (V2.6.1) | | | | | | | |

FIG. 5

Input Image Register — 505

| | Bit 7 | Bit 6 | Bit 5 | Bit 4 | Bit 3 | Bit 2 | Bit 1 | Bit 0 |
|---|---|---|---|---|---|---|---|---|
| Byte 0 | Reset Safe Direction Status | Reset Safe Stop Status | SW Gate Status | Reset Safe Speed Status | Reset Other Events Status | Set Start Value Status | Count Status | Direction Status |
| Byte 1 | Reserved | Safe Direction Event | Safe Stop Event | Safe Speed Event | Overflow Event | Underflow Event | Zero Event | CQ HSC0 |
| Byte 2-5 | High Speed Counter 0 - Current Value | | | | | | | |
| Byte 6-9 | High Speed Counter 0 - Measured Value | | | | | | | |
| Byte 10-13 | PROFIsafe Trailer (V2.4) | | | | | | | |
| Byte 10-14 | PROFIsafe Trailer (V2.6.1) | | | | | | | |

Figure 7:
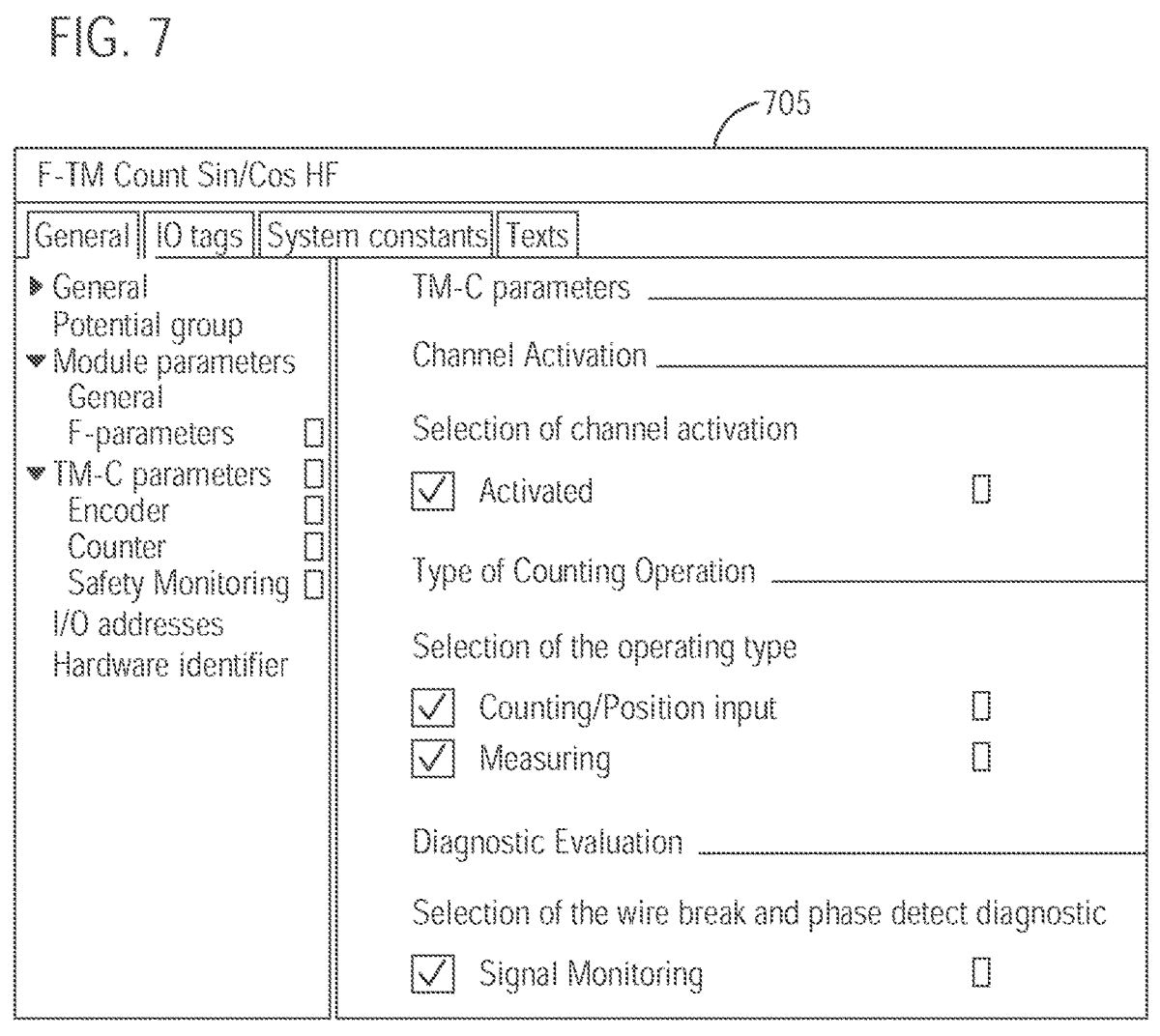

F-TM Count Sin/Cos HF

| General | IO tags | System constants | Texts |

► General
  Potential group
▼ Module parameters
  General
  F-parameters ☐
▼ TM-C parameters ☐
  Encoder ☐
  Counter ☐
  Safety Monitoring ☐
  I/O addresses
  Hardware identifier TM-C parameters ─────────

Channel Activation ─────────

Selection of channel activation

☑ Activated                    ☐

Type of Counting Operation ─────────

Selection of the operating type

☑ Counting/Position input      ☐
☑ Measuring                    ☐

Diagnostic Evaluation ─────────

Selection of the wire break and phase detect diagnostic

☑ Signal Monitoring            ☐

FIG. 12

Table 1 - Safety Integrity Levels: Target Failure Values for SRCFs

| Safety Integrity Level | Probability of a Dangerous Failure per Hour (PFH$_D$) |
|---|---|
| 3 | $\geq 10^{-8}$ to $< 10^{-7}$ |
| 2 | $\geq 10^{-7}$ to $< 10^{-6}$ |
| 1 | $\geq 10^{-6}$ to $< 10^{-5}$ |

Table 2 - Performance Levels (PL)

| PL | Average Probability of Dangerous Failure per Hour (PFH$_D$) 1/h |
|---|---|
| a | $\geq 10^{-5}$ to $< 10^{-4}$ |
| b | $\geq 3 \times 10^{-6}$ to $< 10^{-5}$ |
| c | $\geq 10^{-6}$ to $< 3 \times 10^{-6}$ |
| d | $\geq 10^{-7}$ to $< 10^{-6}$ |
| e | $\geq 10^{-8}$ to $< 10^{-7}$ |

Figure 18:
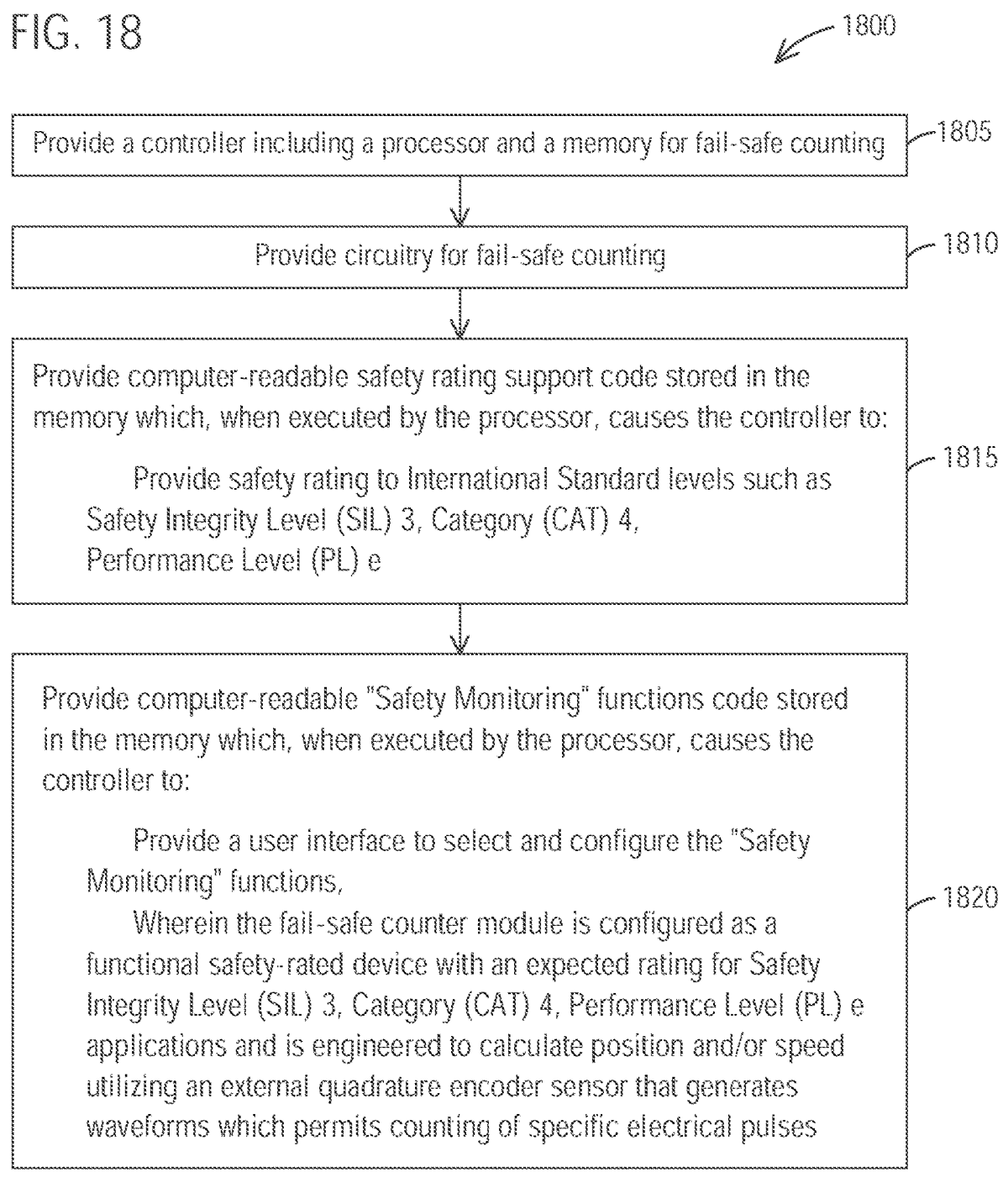

Provide a controller including a processor and a memory for fail-safe counting  ‾1805

Provide circuitry for fail-safe counting  ‾1810

Provide computer-readable safety rating support code stored in the memory which, when executed by the processor, causes the controller to:

Provide safety rating to International Standard levels such as Safety Integrity Level (SIL) 3, Category (CAT) 4, Performance Level (PL) e

‾1815

Provide computer-readable "Safety Monitoring" functions code stored in the memory which, when executed by the processor, causes the controller to:

Provide a user interface to select and configure the "Safety Monitoring" functions,
Wherein the fail-safe counter module is configured as a functional safety-rated device with an expected rating for Safety Integrity Level (SIL) 3, Category (CAT) 4, Performance Level (PL) e applications and is engineered to calculate position and/or speed utilizing an external quadrature encoder sensor that generates waveforms which permits counting of specific electrical pulses

‾1820

FUNCTIONAL SAFETY HIGH-SPEED FAIL-SAFE COUNTER MODULE

BACKGROUND

1. Field

Aspects of the present invention generally relate to a functional safety high-speed fail-safe counter module that is configured for performing fail-safe counting of specific electrical pulses.

2. Description of the Related Art

A counter can be used to count up or count down in numbers. A counter circuit is usually constructed of a number of flip-flops connected in cascade or in software code. Counters are a very widely used component in digital circuits, and are manufactured as separate integrated circuits and also incorporated as parts of larger integrated circuits.

A "fail-safe" term in engineering means a design feature or a practice that in the event of a specific type of failure, inherently responds in a way that will cause no or minimal harm to other equipment, the environment or to people. A system being "fail-safe" does not mean that failure is impossible or improbable, but rather that the system's design prevents or mitigates unsafe consequences of the system's failure. Fail-safe means that a device will not endanger lives or property when it fails (see international standards IEC 61508, EN 13849 and IEC 62061).

Safety monitoring functions are independent from any external dependency (safety-rated programmable logic controller (PLC)). Other vendors have solved this problem by performing redundant and/or diverse measurements within an application of the safety-rated PLC. Therefore, the functional safety ratings are achieved predominately through library blocks executed dependent upon additional capabilities resident within the safety-rated PLC.

Therefore, there is a need for a better fail-safe counter module to simplify the implementation in a control program and to improve the safety reaction time by permitting the module to recognize the violation in an external application.

SUMMARY

Briefly described, aspects of the present invention relate to a fail-safe counter module being a functional safety-rated device with an expected rating for Safety Integrity Level (SIL) 3, Category (CAT) 4, Performance Level (PL) e applications, it is engineered to calculate speed and/or position utilizing an external encoder sensor that generates waveforms which permits the counting of specific electrical pulses. This module is wired to an external quadrature encoder using a Sin/Cos 4-wire differential electrical interface. These electrical signals are used to establish high-speed counting which can be used to indicate position and/or speed. This module achieves SIL 3, CAT 4, PL e safety ratings independently without any external dependence upon the application program executing within a safety-rated programmable logic controller (PLC). Additionally, the module can perform separate safety monitoring functions internal to module. The operation of these safety monitoring functions (they are configured from a PC through a PLC) are again independent from any external dependency (safety-rated PLC). The fail-safe counter module reports events and statuses based on configured parameters and external movement operations in a distributed I/O system. It provides a Sin/Cos encoder interface that can safely count up to a maximum speed of 200 kHz. With the above set forth properties of the module and its updated firmware, the functional safety ratings are achieved entirely within the fail-safe counter module and the safety monitoring functions are performed internal to the fail-safe counter module. No programmable logic controller (PLC) dependence is required in order to achieve functional safety ratings.

In accordance with one illustrative embodiment of the present invention, a fail-safe counter module comprises a controller including a processor and a memory and circuitry for fail-safe counting. The fail-safe counter module further comprises computer-readable safety rating support code stored in the memory which, when executed by the processor, causes the controller to provide safety rating to International Standard levels such as Safety integrity Level (SIL) 3, Category (CAT) 4, Performance Level (PL) e. The fail-safe counter module further comprises computer-readable "Safety Monitoring" functions code stored in the memory which, when executed by the processor, causes the controller to work with a user interface (the user interface is provided from a PC) to select and configure the "Safety Monitoring" functions. The fail-safe counter module is a functional safety-rated device with an expected rating for SIL 3, CAT 4, PL e applications and is engineered to calculate position and/or speed utilizing an external quadrature encoder sensor that generates waveforms which permits counting of specific electrical pulses.

In accordance with one illustrative embodiment of the present invention, a method for fail-safe counting is provided. The method comprises a step of providing a controller including a processor and a memory. The method further comprises a step of providing circuitry for fail-safe counting. The method further comprises a step of providing computer-readable safety rating support code stored in the memory which, when executed by the processor, causes the controller to: provide safety rating to International Standard levels such as Safety Integrity Level (SIL) 3, Category (CAT) 4, Performance Level (PL) e. The method further comprises a step of providing computer-readable "Safety Monitoring" functions code stored in the memory which, when executed by the processor, causes the controller to: work with a user interface (the user interface is provided from a PC) to select and configure the "Safety Monitoring" functions. The fail-safe counter module is a functional safety-rated device with an expected rating for Safety Integrity Level (SIL) 3, Category (CAT) 4, Performance Level (PL) e applications and is engineered to calculate position and/or speed utilizing an external quadrature encoder sensor that generates waveforms which permits counting of specific electrical pulses.

BRIEF DESCRIPTION OF THE DRAWINGS

FIG. 5 illustrates a schematic view of an input image register of a fail-safe counter module in accordance with an exemplary embodiment of the present invention.

FIG. 7 illustrates a schematic view of a TM-C parameterization page of fail-safe counting in accordance with an exemplary embodiment of the present invention.

FIG. 12 illustrates a schematic view of tables 1 and 2 of SIL and PL in accordance with an exemplary embodiment of the present invention.

FIG. 18 illustrates a schematic view of a flow chart of a method for fail-safe counting in accordance with an exemplary embodiment of the present invention.

DETAILED DESCRIPTION

Figure 1:
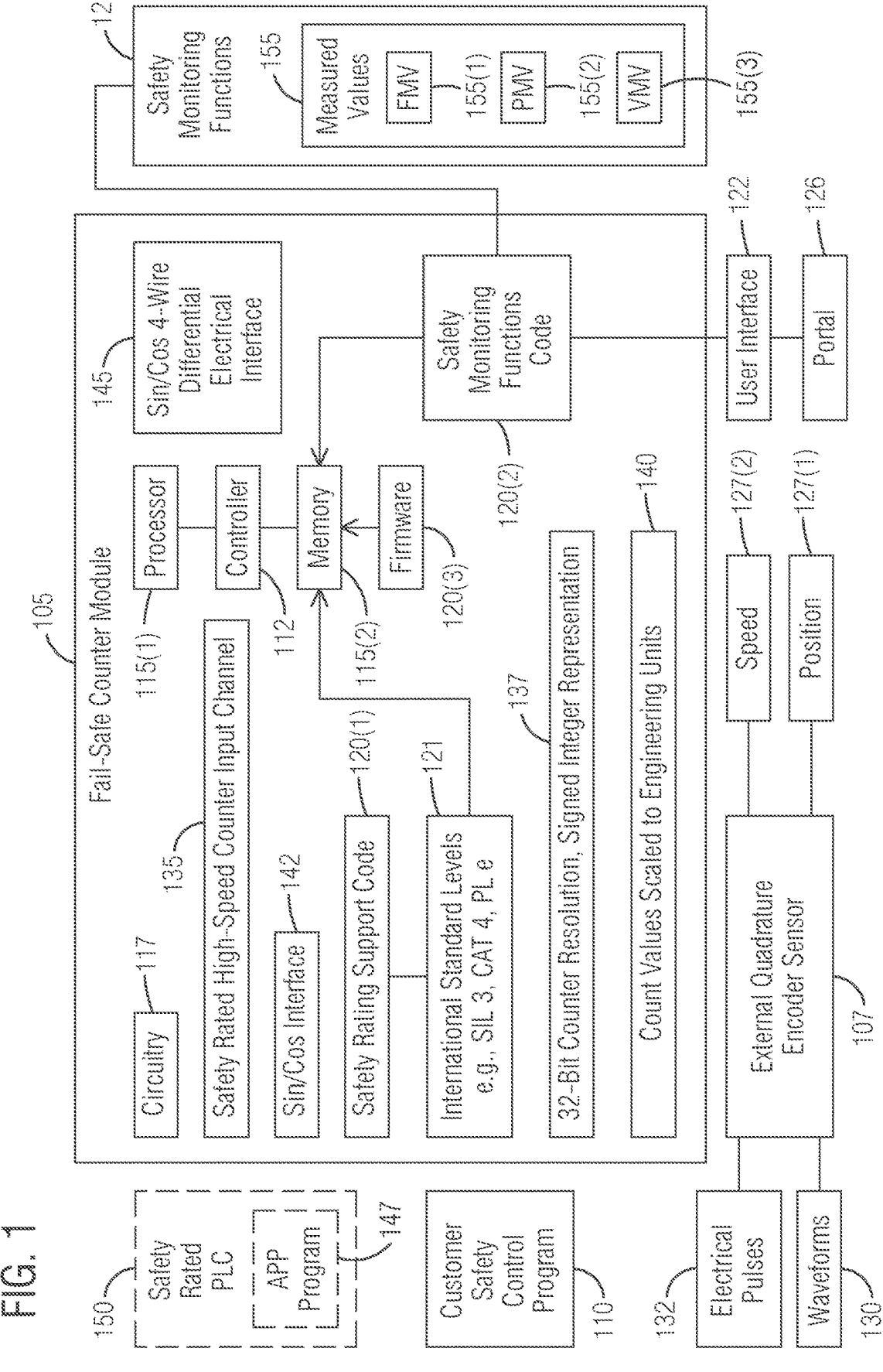
FIG. 1 illustrates a block diagram of a fail-safe counter module coupled to an external quadrature encoder sensor in accordance with an exemplary embodiment of the present invention.

To facilitate an understanding of embodiments, principles, and features of the present invention, they are explained hereinafter with reference to implementation in illustrative embodiments. In particular, they are described in the context of a functional safety high-speed fail-safe counter module that is configured for performing fail-safe counting of specific electrical pulses. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the fail-safe counter module according to the present disclosure are described below with reference to FIGS. 1-18 herein. Like reference numerals used in the drawings identify similar or identical elements throughout the several views. The drawings are not necessarily drawn to scale.

Consistent with one embodiment of the present invention, FIG. 1 represents a block diagram of a fail-safe counter module 105 coupled to an external quadrature encoder sensor 107 in accordance with an exemplary embodiment of the present invention. The fail-safe counter module 105 is configured for performing fail-safe counting of specific electrical pulses. The fail-safe counter module 105 reports events and statuses based on configured parameters and external movement operations in a distributed I/O system. It provides a SIN/COS encoder interface that can safely count up to a maximum speed of 200 kHz. With the new properties of the module 105 and its updated firmware, functional safety ratings (e.g., safety rating to International Standard levels such as Safety Integrity Level (SIL) 3, Category (CAT) 4, Performance Level (PL) e) are achieved entirely within the fail-safe counter module 105 and safety monitoring functions (e.g., a user interface is provided to select and configure the "Safety Monitoring" functions) are performed internal to the fail-safe counter module 105.

The fail-safe counter module 105 provides safety monitoring functions that may be used to monitor speed, position, and/or direction. These safety monitoring functions can be optionally enabled to report safety events if configured safety limits are exceeded. The safety monitoring functions include the following: Safe Direction (SDI) is used to monitor the direction of motion, Safety Limited Speed (SLS) is used to monitor that the motion does not exceed a preset speed limit and Safe Operating Stop (SOS) is used to monitor for unintentional movement.

Safety monitoring features are included inherently within this module 105. These functions can be performed (monitored) to a Safety Integrity Level 3 (SIL 3) independent from any other device. Dependence upon the safety PLC is not required to perform the monitoring. Depending upon customer configuration, the module 105 will compare the currently calculated count and/or velocity against the configured limits. If a violation is detected, the module 105 will report this violation to the customer's PLC safety program. The safety program can then take whatever action is necessary to bring the process to a safe condition. Three distinct features can optionally be deployed by the customer: when the external movement should be stopped (SOS), but then moves more than a configured amount, a violation is detected and reported by the module 105, when the external movement should only move in one direction (SDI), but then moves more than a configured amount in the opposite direction, a violation is detected and reported by the module 105 and when the external movement is moving (SLS), but its velocity is too fast (moves too quickly), a violation is detected and reported by the module 105.

The module 105 can optionally (based upon a customer choice) safely monitor speed, direction, or deviation from a stop position. The module 105 does this uniquely, meaning it is not dependent upon any other logic or device. The capability is incorporated solely into the module's firmware. The customer can enable and disable this functionality (safety monitoring). A customer's safety control program 110 can then enable and disable when safety monitoring occurs based upon their application's needs. For example, when a motion should be stopped, the customer's safety control program 110 can inform the module 105 that it should not move. If it does move, the module 105 can report a violation to the customer's safety control program 110. There is no logic the customer has to create in order to accomplish this behavior.

Functional safety-related systems are primarily concerned with applications whose failure could have impact upon the safety of people and/or the environment. As a result, safety-related systems are used to mitigate hazards or failures that are likely to cause physical harm. Their intent is to achieve safety to an acceptable level of tolerable risk. Fail-safe systems serve to control processes and ensure safe states upon detected failures. Failures are detected using very high levels of diagnostic coverage. Upon detection of failures, actions are taken to attempt to bring the respective application to a safe state. Fail-safe systems provide improved fault detection and fault localization through detailed diagnostic identification and reporting. This is the primary difference between fail-safe systems and standard systems. Use of fail-safe systems should be considered for applications in which hazards are inherently present and may result in physical harm. The module 105 satisfies safety ratings defined in the international standards such as it supports safety-related applications up to SIL CL 3 according to EN 62061, or Category 4, PL e according to EN 13849-1.

The fail-safe counter module 105 comprises a controller 112 including a processor 115(1) and a memory 115(2). The fail-safe counter module 105 further comprises circuitry 117 and computer-readable safety rating support code 120(1) stored in the memory 115(2) which, when executed by the processor 115(1), causes the controller 112 to provide safety rating to International Standard levels such as Safety Integrity Level (SIL) 3, Category (CAT) 4, Performance Level (PL) e 121. The fail-safe counter module 105 further comprises computer-readable "Safety Monitoring" functions code 120(2) stored in the memory 115(2) which, when executed by the processor 115(1), causes the controller 112 to work with a user interface 122 to select and configure the "Safety Monitoring" functions 125. The user interface 122 shall be provided in a portal 126 for the configuration of safety functions. The fail-safe counter module 105 is a functional safety-rated device with an expected rating for Safety Integrity Level (SIL) 3, Category (CAT) 4, Performance Level (PL) e applications and is engineered to calculate position 127(1) and/or speed 127(2) utilizing the external quadrature encoder sensor 107 that generates waveforms 130 which permits counting of specific electrical pulses 132. The Portal and corresponding user interface execute in a PC which connects to a PLC by downloading configuration and programming information. The modules, including this F-TM-C module, connect to the PLC and receives its parameterization through the PLC, which originated in a TIA Portal user interface. The only dynamic user interface inherent in the module are the LEDs.

The fail-safe counter module 105 further comprises a safety rated high-speed counter input channel 135. The fail-safe counter module 105 further comprises computer-readable firmware code 120(3) stored in the memory 115(2) which, when executed by the processor 115(1), causes the controller 112 to provide 32-bit resolution, signed integer representation 137 and count values scaled to engineering units 140. The fail-safe counter module 105 further comprises a Sin/Cos interface 142. The fail-safe counter module 105 further comprises a Sin/Cos 4-wire differential electrical interface 145 that wires the fail-safe counter module 105 to the external quadrature encoder sensor 107. The electrical signals from the external quadrature encoder sensor 107 are used to establish high-speed counting which can be used to indicate the position 127(1) and/or the speed 127(2).

The fail-safe counter module 105 achieves Safety Integrity Level (SIL) 3, Category (CAT) 4, Performance Level (PL) e safety ratings independently without any external dependence upon an application program 147 executing within a safety-rated Programmable Logic Controller (PLC) 150. The fail-safe counter module 105 performs separate "Safety Monitoring" functions 125 internal to the fail-safe counter module 105 as the "Safety Monitoring" functions 125 are independent from any external monitoring dependency from the safety-rated Programmable Logic Controller (PLC) 150 such that the "Safety Monitoring" functions 125 are fully performed within the fail-safe counter module 105 which also independently achieves Safety Integrity Level (SIL) 3, Category (CAT) 4, Performance Level (PL) e safety ratings. The "Safety Monitoring" functions 125 include configuration of "Measured Values" 155. The "Measured Values" 155 include a Frequency Measured Value (FMV) 155(1), a Period Measured Value (PMV) 155(2) and a Velocity Measured Value (VMV) 155(3).

For a measured value determination, a user can select one at a time from the following measured values reported: frequency measurement with the unit of millihertz (−800000000 to +800000000 meaning −800000.000 to +800000.000 Hz), period measurement with the unit of microseconds (−25000000 to +25000000 meaning −25.000000 to +25.000000 seconds), velocity measurement is the calculated velocity*1000 to include fractional portion of the calculation (−2147483648 to 2147483647 meaning −2147483,648 to +2147483.647 velocity unit). All measured values are returned as scaled integers with the units noted above. Negative values are reported when counting below 0, positive values are reported when counting up.

For velocity in feet per second, set the "Time Base for Velocity Measurement" field to the value "1 second" and the "Counts per Unit for Velocity" to how many counts per engineering unit the encoder will generate. The velocity value returned to a safety program will be the engineering unit per second value*1000. Multiplying the feet per second value by 1000 ensures the velocity value has sufficient resolution to show the fractional portion of the calculation. The fail-safe counter module 105 evaluates the input frequency. When encoder signal frequency reaches the maximum frequency rating (200 kHz), a reintegratable frequency error is generated.

Figure 2:
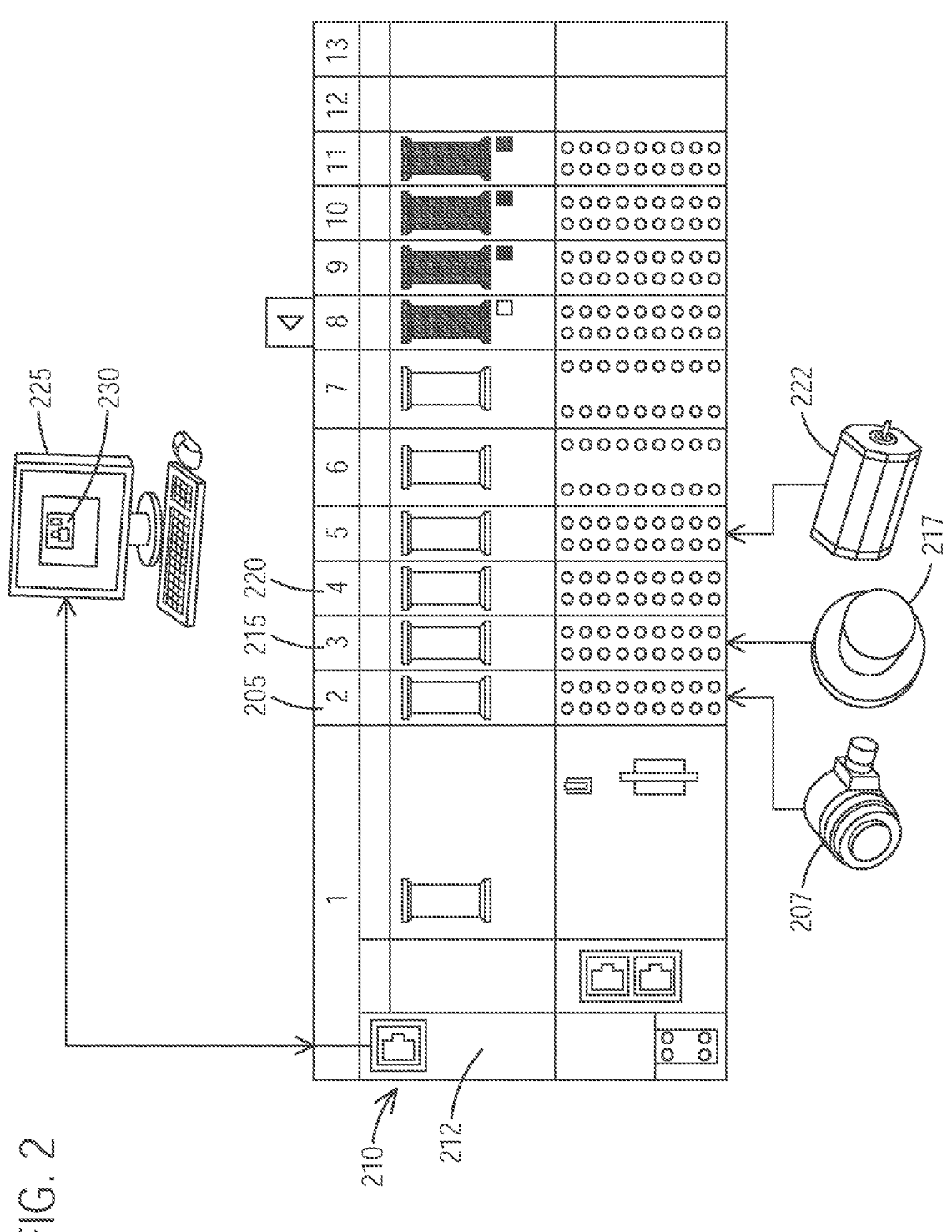
FIG. 2 illustrates a hardware diagram of a fail-safe counter module coupled to an external quadrature encoder sensor in accordance with an exemplary embodiment of the present invention.

Referring to FIG. 2, it illustrates a hardware diagram of a fail-safe counter module 205 coupled to an external quadrature encoder sensor 207 in accordance with an exemplary embodiment of the present invention. A rack 210 is shown on which a PLC 212 with a CPU and the fail-safe counter module 205 are mounted. The rack 210 comprises an input (I/P) module (safety) 215 connected to a safety emergency stop button 217 and an output (O/P) module 220 connected to a motor 222. The rack 210 comprises functional safety modules and non-functional safety modules. The rack 210 is connected to a display monitor 225 which displays a user interface 230 for the fail-safe counter module 205, among others.

Figures 3, 4:
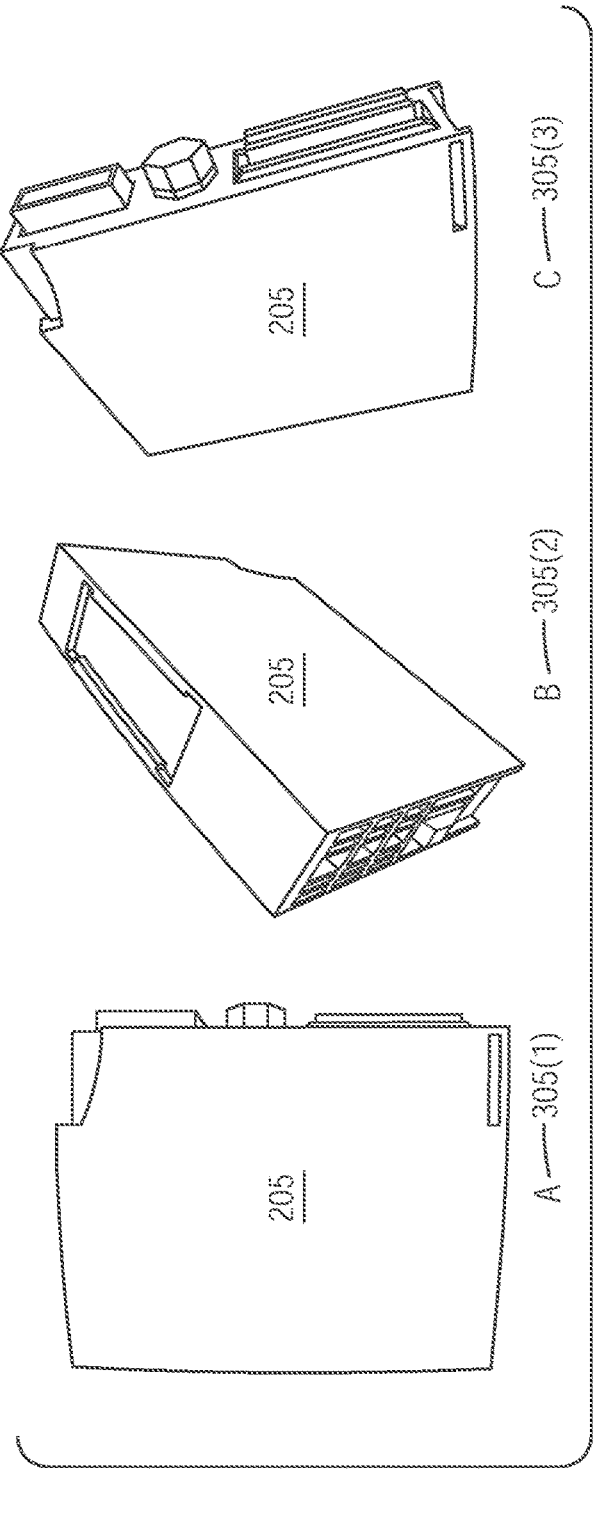
FIG. 3 illustrates prototype views A, B, C of a fail-safe counter module in accordance with an exemplary embodiment of the present invention.
FIG. 4 illustrates a schematic view of an output image register of a fail-safe counter module in accordance with an exemplary embodiment of the present invention.

Turning now to FIG. 3, it illustrates three prototype views A, B, C 305(1-3) of the fail-safe counter module 205 in accordance with an exemplary embodiment of the present invention. The fail-safe counter module 205 features a 15-mm wide, module housing. The input and output values of the safety-related fail-safe counter module 205 are addressed using a process image. The fail-safe counter module 205 uses a Fail-safe CPU for safety processing. The fail-safe counter module 205 reports when the parameter limits are exceeded to a F-CPU. The firmware code (this is safety application code created and downloaded from the PC and it is not really "firmware" code in a traditional sense) in a safety program does the following: examines the safety-monitoring event data from the module 205 and takes the necessary action to result in the appropriate outcome (for example, slowing down, or shutting down movement).

The fail-safe counter module 205 monitors encoder signals and evaluates them as quadrature encoded signals. The count direction is determined by the phase relationship of the encoder signals. The fail-safe counter module 205 can be configured to configure the behavior of the counter at the counting limits. The counting limits define the counter value range used. A user can configure a start value within the counting limits.

For configuring the fail-safe counter module 205 parameters one can specify the properties of the fail-safe counter module 205 using various parameters. Depending on the settings, not all parameters are available. You set the parameters of the module as follows: 1. Insert a CPU or a PROFINET or PROFIBUS interface module from the hardware catalog, 2. Insert the fail-safe counter module 205 from the hardware catalog under "Technology modules->Counting->F-TM Count", 3. Select the fail-safe counter module 205 (on the Device view or Device overview) and view the module's "Properties" tab, 4. In the "Properties" view, on the "General" tab, select the drop-down arrows for "Module parameters" and "TM-C parameters" to and see a subset of the properties of the "F-parameters" and "TM-C parameters", 5. Select "F-parameters" property or one of the "TM-C parameters" properties in the left-side property tree and then set values in the right-side property fields and 6. A successful compile and download of your hardware configuration to a Fail-safe CPU automatically configures the fail-safe counter module 205.

FIG. 4 illustrates a schematic view of an output image register 405 of the fail-safe counter module 205 in accordance with an exemplary embodiment of the present invention. The SW gate is a user program control bit to permit the counter to count—counting commences when enabled (opened). Set to Start Value is a user program command to reset current counter value to the configured start value. Safe Direction Enable is a user program command to engage "Safe Direction" monitoring (SDI). Safe Direction is a specification of the safe direction. Stop State Enable is a user program command to engage "Safe Operating Stop" monitoring (SOS). Speed Monitoring Enable is a user program command to engage "Safe Speed" monitoring (SLS). Reset Events is a user program command to clear event and status bits.

As seen in FIG. 5, it illustrates a schematic view of an input image register 505 of the fail-safe counter module 205 in accordance with an exemplary embodiment of the present invention. The input image register 505 contains counter values, various status and event information. For example, HSC counter values, 32-bit integer count, and corresponding HSC scaled values (speed, frequency, . . . ). It further contains statuses: set to indicate the various status activities and actions. It further contains Safety Function Events: set when a safety function is violated. It further contains over/under flow event: set whenever the respective counter limit has been exceeded. It further contains zero crossing event: set at positive/negative count transitions.

Figure 6:
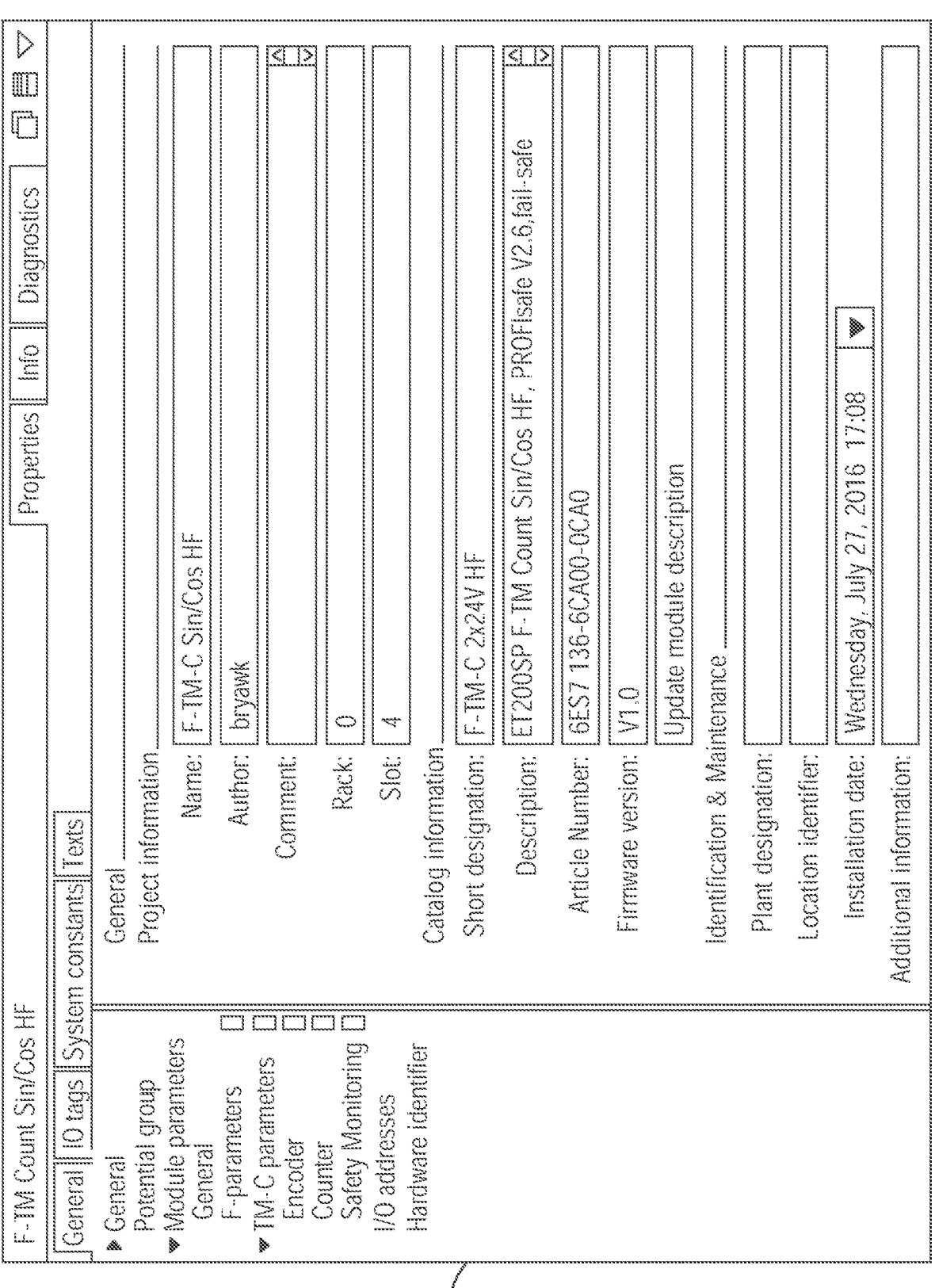
FIG. 6 illustrates a schematic view of a general parameterization page of fail-safe counting in accordance with an exemplary embodiment of the present invention.

As shown in FIG. 6, it illustrates a schematic view of a general parameterization page 605 of fail-safe counting in accordance with an exemplary embodiment of the present invention. The general parameterization page 605 includes properties of Sin/Cos HF (High Feature) of the fail-safe counter module 205.

In FIG. 7, it illustrates a schematic view of a TM-C parameterization page 705 of fail-safe counting in accordance with an exemplary embodiment of the present invention. The TM-C parameterization page 705 includes counting types: activated (always enabled since there is only a single channel), counting pulses (always returned) and measured engineering units (always returned):—Frequency (default),—or—Velocity,—or—Period Duration.

Figure 8:
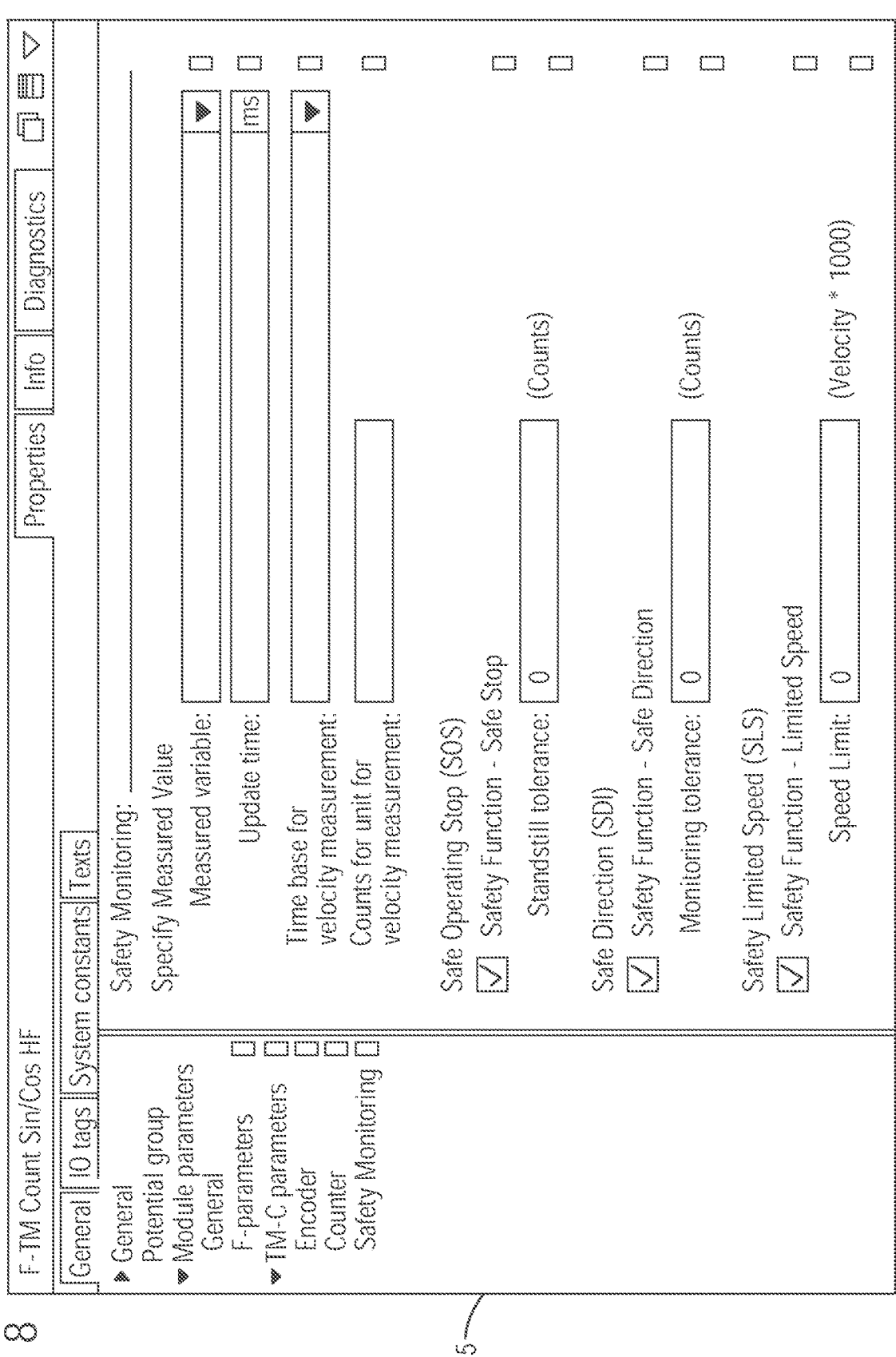
FIG. 8 illustrates a schematic view of safety monitoring functions of fail-safe counting in accordance with an exemplary embodiment of the present invention.

With regard to FIG. 8, it illustrates a schematic view of Safety Monitoring Functions 805 of fail-safe counting in accordance with an exemplary embodiment of the present invention. The Safety Monitoring Functions 805 are configured and performed in the fail-safe counter module 205. The Safety Monitoring Functions 805 include Safety Limited Speed—moving too fast, Safe Operating Stop—moving at all, and Safe Direction—unintentionally moving in an unsafe direction.

Figure 9:
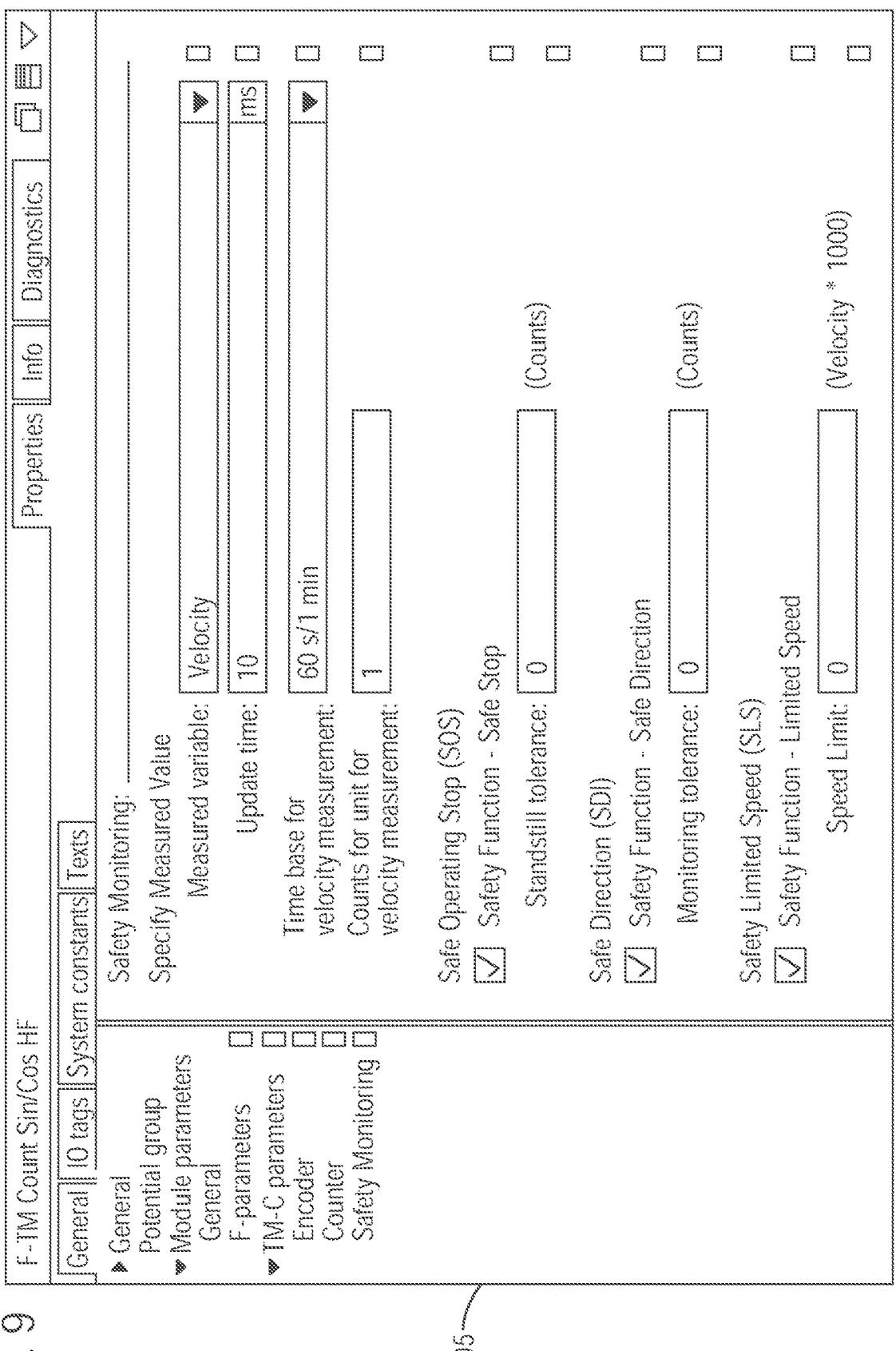
FIG. 9 illustrates a schematic view of measured values—velocity of fail-safe counting in accordance with an exemplary embodiment of the present invention.

With respect to FIG. 9, it illustrates a schematic view of measured values—velocity of fail-safe counting in accordance with an exemplary embodiment of the present invention. Measured. Value Selections are: update time being the minimum interval between each calculation of measured values, time base being the selectable unit of time used in velocity calculations and count being the specification of the total counts per unit of distance measure (500 counts/meter). Ranges are: update time: 5 milliseconds to 25,000 milliseconds (5 ms estimated module scan), time-base: 1 millisecond, 10 milliseconds, 100 milliseconds, 1 second, 60 seconds and counts per unit: 1 to 64K The algorithm is: velocity=(total counts/update time)*(time base)/(counts per unit), velocity returned in fixed integer notation, least significant 3 digits imply precision to 3 decimal points and signed 32-bit number representing velocity units*1,000.

Figure 10:
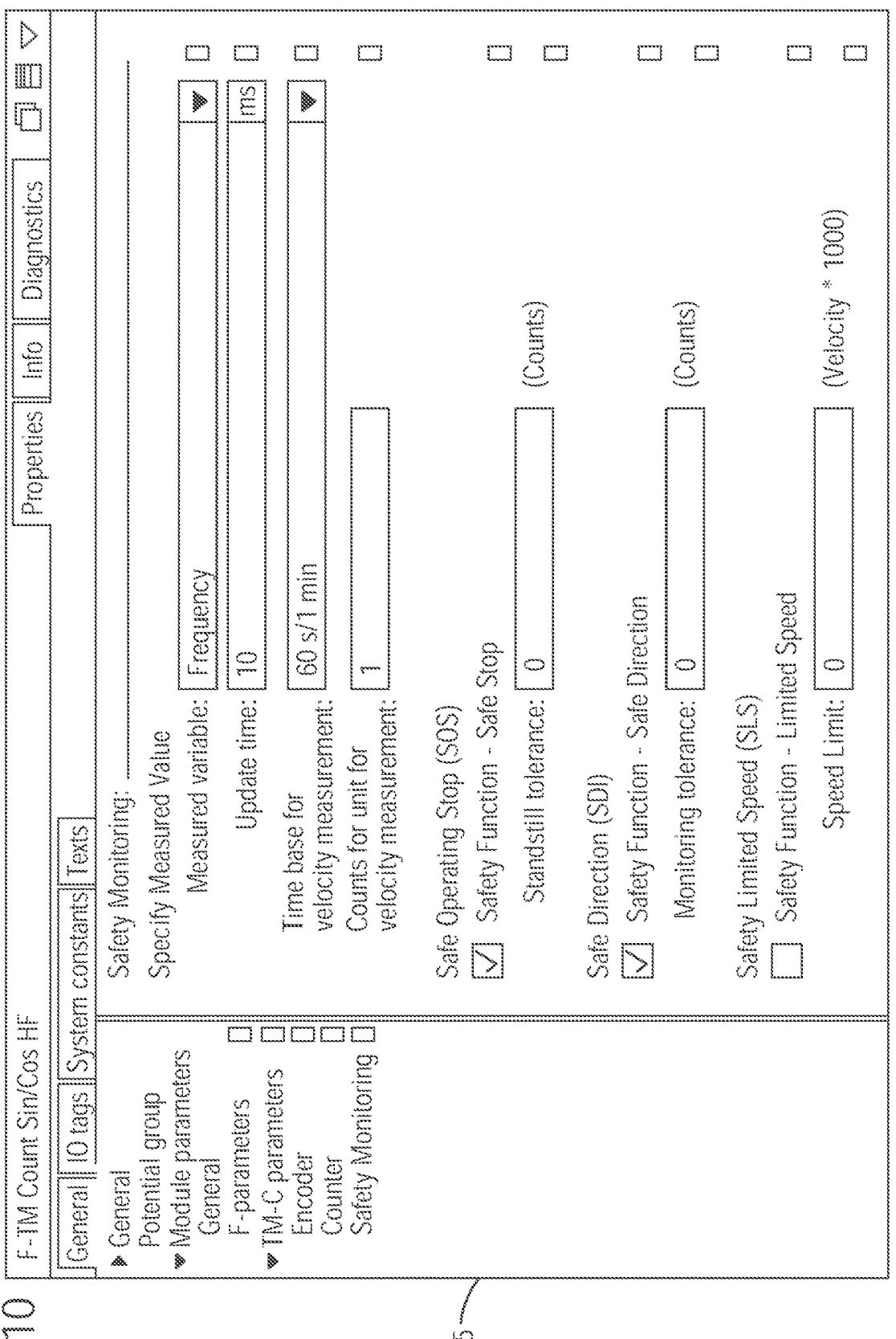
FIG. 10 illustrates a schematic view of measured values—frequency of fail-safe counting in accordance with an exemplary embodiment of the present invention.

FIG. 10 illustrates a schematic view of measured values—frequency of fail-safe counting in accordance with an exemplary embodiment of the present invention. Measured Value Selections are: update time is the interval between measured values (note: actual units are Hertz*1000 (millihertz)). Ranges are: update time: 5 milliseconds to 25,000 milliseconds (5 ms estimated module scan). The algorithm is: frequency=(current count of update time)/(update time), frequency returned in fixed integer notation, least significant 3 digits imply precision to 3 decimal points and signed 32-bit number representing Hertz*1,000.

Figure 11:
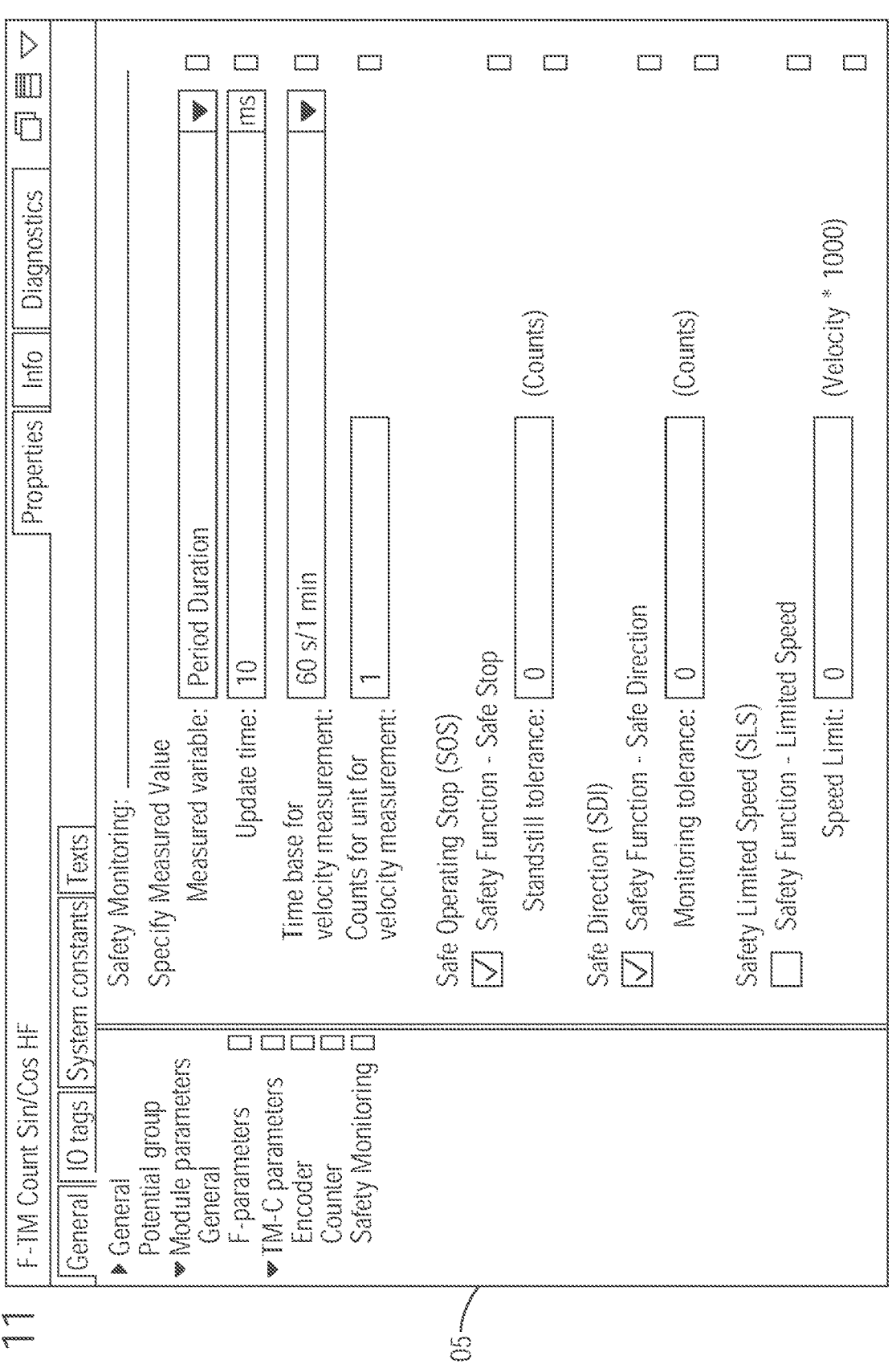
FIG. 11 illustrates a schematic view of measured values—period duration of fail-safe counting in accordance with an exemplary embodiment of the present invention.

FIG. 11 illustrates a schematic view of measured values period—duration of fail-safe counting in accordance with an exemplary embodiment of the present invention. Measured Value Selections are: update time is the interval between measured values (note: actual units are seconds). Ranges are: time: 5 milliseconds to 25,000 milliseconds (5 ms estimated module scan). The algorithm is: period duration=1/(frequency), period returned in fixed integer notation, least significant 6 digits imply precision to 6 decimal points and signed 32-bit number representing microseconds.

FIG. 12 illustrates a schematic view of Tables 1 and 2 of Safety Integrity Level (SIL) and Performance Level (PL) in accordance with an exemplary embodiment of the present invention. In Table 1. SIL levels 1-3 and their probability of a dangerous failure per hour is shown. In Table 2, PL levels a-e and their average probability of a dangerous failure per hour is shown.

Figure 13:
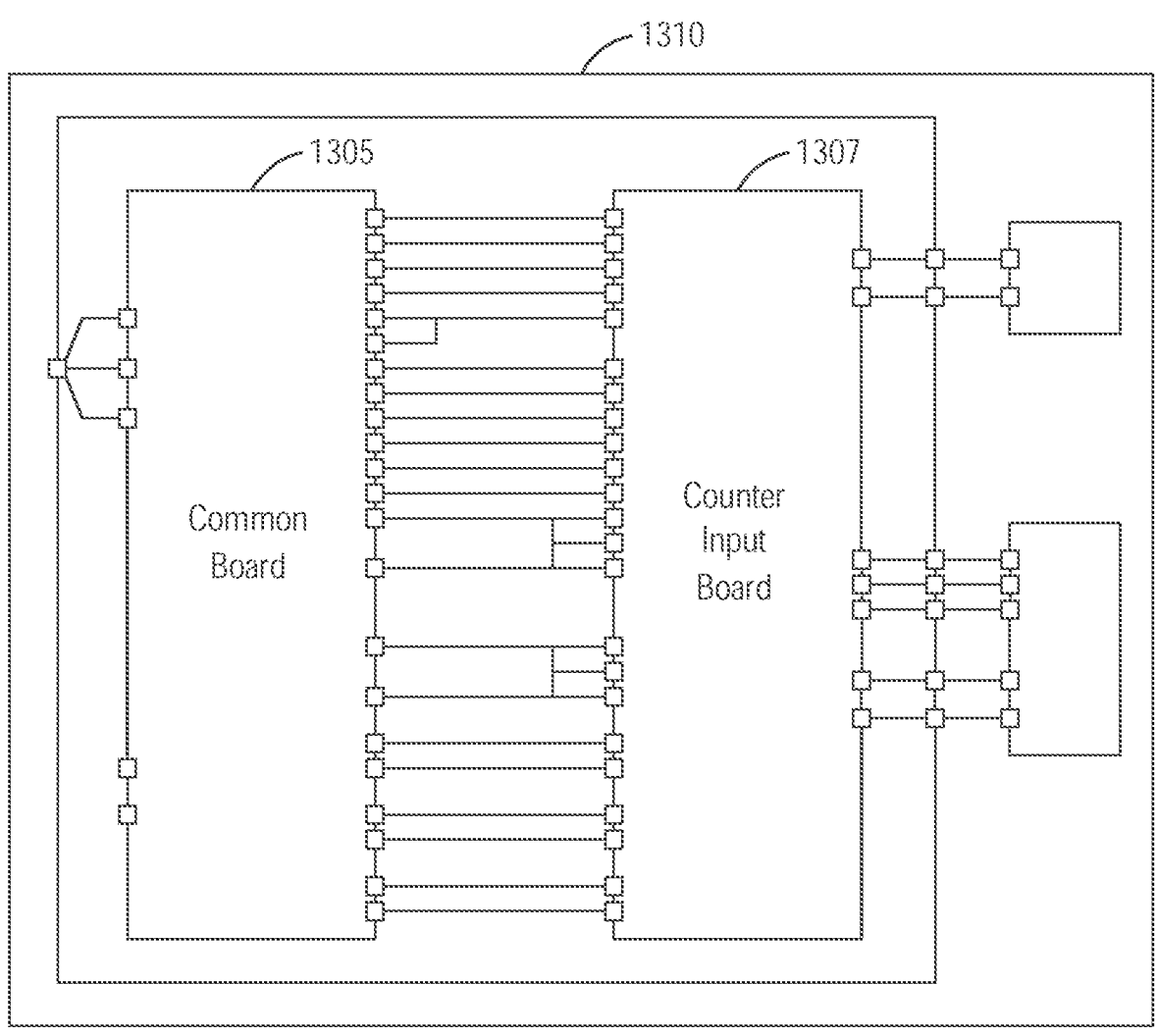
FIG. 13 illustrates a schematic view of a common board and a counter input board of a fail-safe counter module in accordance with an exemplary embodiment of the present invention.

FIG. 13 illustrates a schematic view of a common board 1305 and a counter input board 1307 of a fail-safe counter module 1310 in accordance with an exemplary embodiment of the present invention. The common board 1305, with small deviations, can be common to all modules. The counter input board 1307 is unique to each module. The common board 1305 consists of redundant microprocessors and supporting logic. The counter input board 1307 consists of circuits that interface to the externally supplied and connected encoder.

Figure 14:
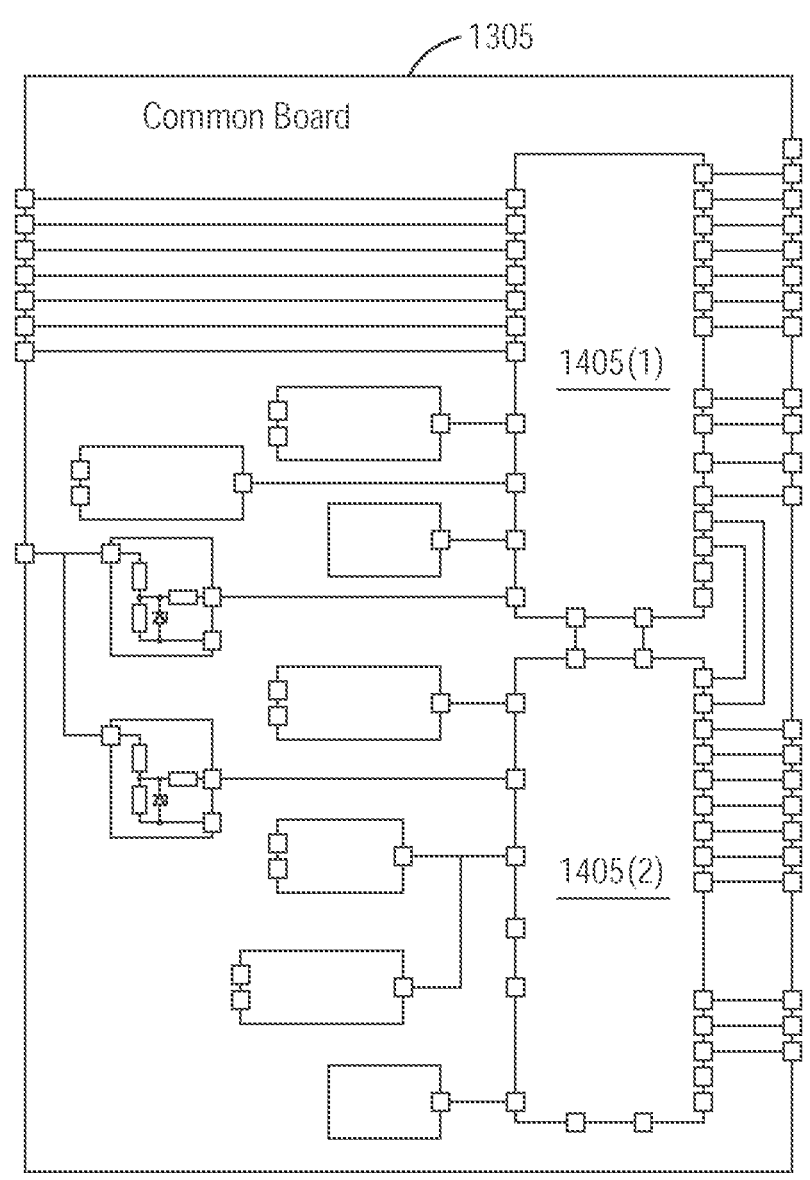
FIG. 14 illustrates a schematic view of additional details of a common board of a fail-safe counter module in accordance with an exemplary embodiment of the present invention.

FIG. 14 illustrates a schematic view of additional details of the common board 1305 of the fail-safe counter module 1310 in accordance with an exemplary embodiment of the present invention. The additional details of the common board 1305 includes first and second microcontrollers 1405 (1), 1405(2). ROM and RAM are contained internal to microprocessors of the first and second microcontrollers 1405(1), 1405(2). The common board 1305 also contains temperature monitors, power supplies, and crystals for each microprocessor.

Figure 15:
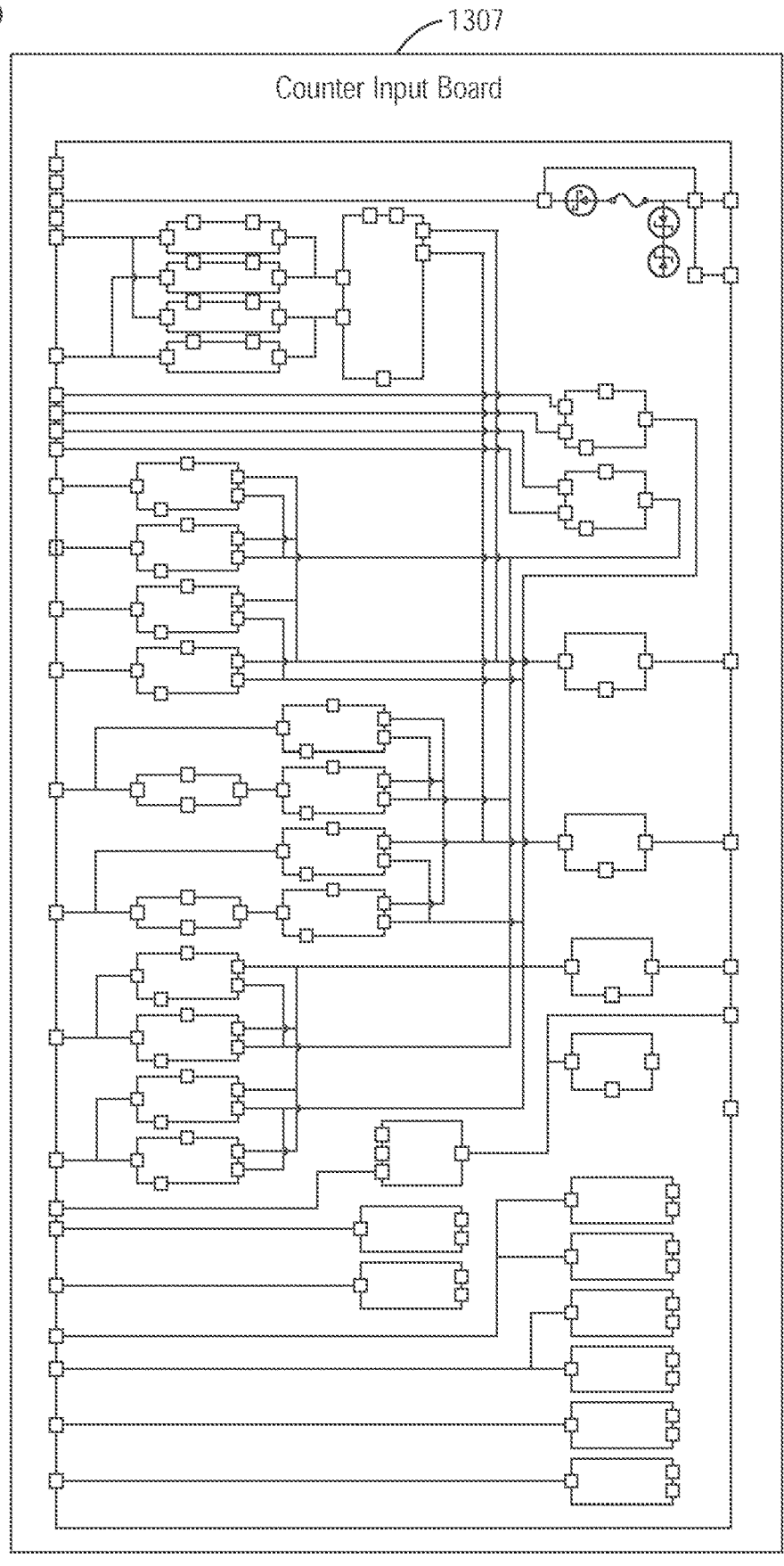
FIG. 15 illustrates a schematic view of additional details of a counter input board of a fail-safe counter module in accordance with an exemplary embodiment of the present invention.

FIG. 15 illustrates a schematic view of additional details of the counter input board 1307 of the fail-safe counter module 1310 in accordance with an exemplary embodiment of the present invention. The counter input board 1307 contains circuits necessary to interface to the externally supplied encoder signals and monitor these signals for accuracy. These signals are subsequently routed to the microprocessors, which perform the actual counting.

Figure 16:
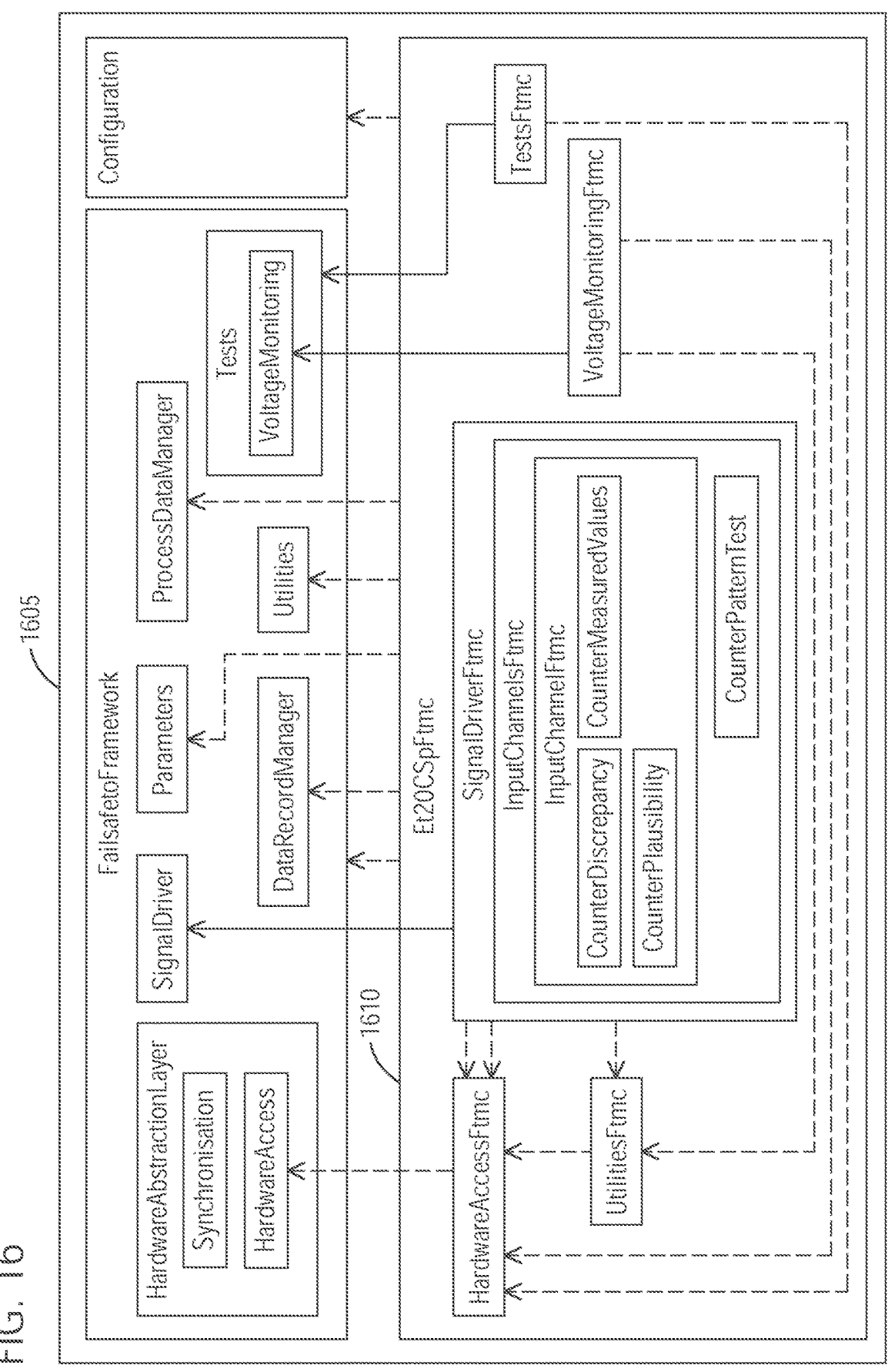
FIG. 16 illustrates a schematic view of software architecture of a fail-safe counter module in accordance with an exemplary embodiment of the present invention.

FIG. 16 illustrates a schematic view of software architecture 1605 of the fail-safe counter module 1310 in accordance with an exemplary embodiment of the present invention. FIG. 16 depicts an overall software architecture of the fail-safe counter module 1310. A "ET200SpFtmc" portion 1610 of the software architecture 1605 is the unique additions for this module. This portion 1610 of the software architecture 1605 is responsible for ensuring that counting is consistent with the failsafe requirements. It also performs the "Counter Measured Value" calculations and monitoring functions. These capabilities are among the unique and novel features of the fail-safe counter module 1310. A measured value specifies one of a possible three different engineering unit conversions as follows: Frequency: The average number of counts per second reported in millihertz (hertz\*1000), Period duration: The average period between two counts in microseconds (seconds\*1000000) and Velocity: The speed of movement in a given direction. Velocity represents the units of measure per time base\*1000.

The SOS function monitors the count value and notifies the user if the encoder/count deviates more than a defined amount from the stopped position. The SLS monitoring is initiated whenever the "Enable Safe Speed" bit is set in a control interface and subsequently processed by the fail-safe counter module 1310. SLS monitoring terminates whenever the "Enable Safe Speed" bit is reset in the process output image and subsequently processed by the module. A "Safe Speed Event" is set whenever the calculated speed in either direction is greater than the configured "Speed limit". Once set, the "Safe Speed Event" bit remains set and counting continues after the event is triggered. The "Safe Speed Event" remains set until the "Reset Safe Speed" control bit to 1, until a power cycle, or until a new parameterization is loaded. Configuring a "Speed limit" value of 0 results in the "Safe Speed Event" being set immediately after the first pulse in either direction.

The SDI monitoring is initiated whenever the "Enable Safe Direction" bit is set in the control interface and subsequently processed by the fail-safe counter module 1310.

The SDI monitoring terminates whenever the "Enable Safe Direction" bit is reset in the process output image and subsequently processed by the module. Each time safe direction monitoring is initiated, the current position and the specified safe direction are stored. The "Safe Direction Event" bit is set whenever a movement is detected in the unsafe direction and exceeds the configured "Monitoring tolerance". The "Monitoring tolerance" is measured from the farthest position achieved in the safe direction. As movement progresses in the safe direction, the tolerance of movement in the unsafe direction shall be measured from this farthest position. Monitoring tolerance is configured in counts. The safe direction is specified in the process output image. Once set, the "Safe Direction Event" bit remains set and counting continues after the event is triggered. The "Safe Direction Event" remains set until the "Reset Safe Direction" bit is set to 1, until a power cycle, or until a new parameterization is loaded. Configuring a value of 0 for the monitoring tolerance results in the "Safe Direction Event" being set immediately after the first pulse in the unsafe direction.

Figure 17:
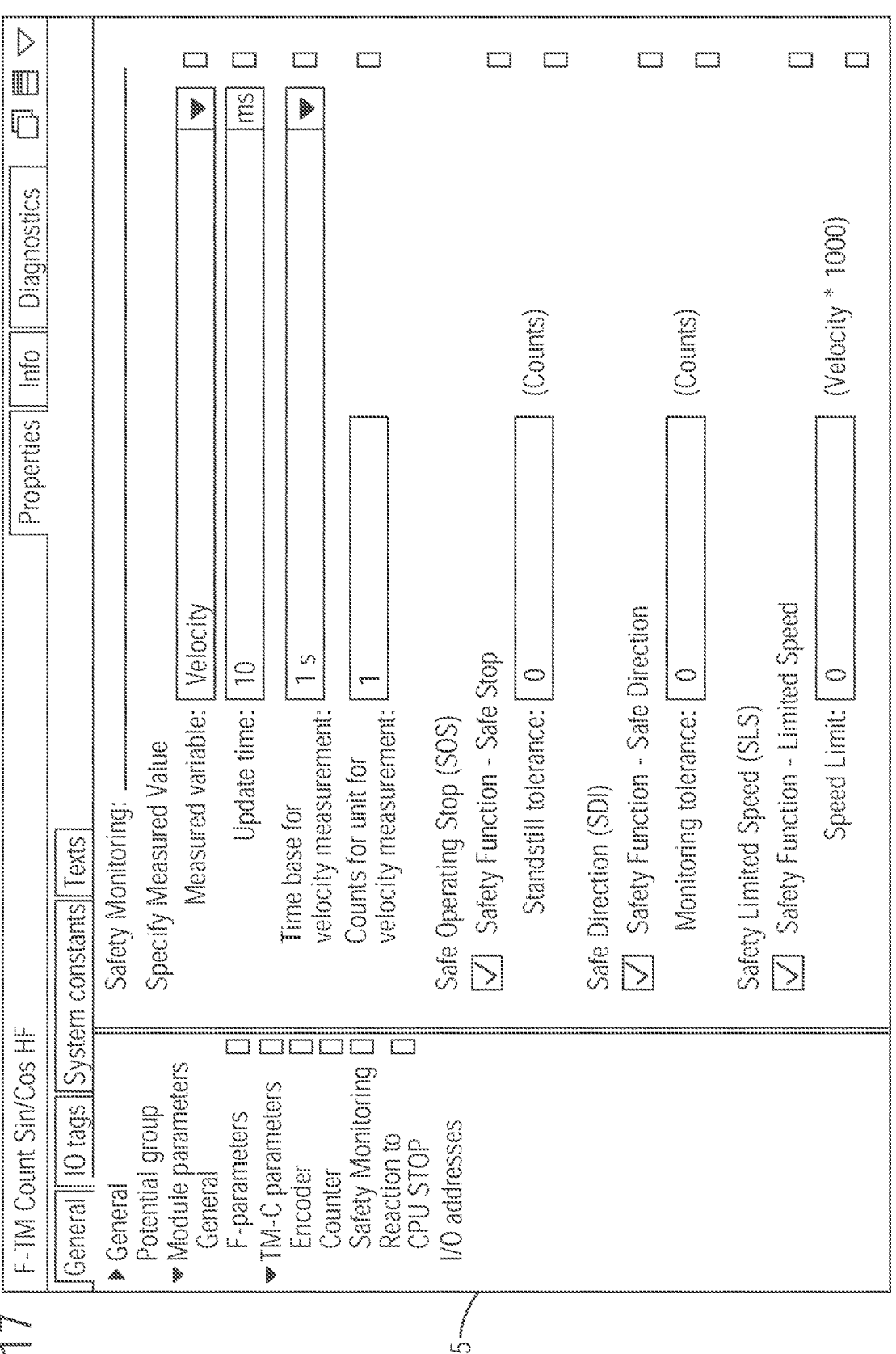
FIG. 17 illustrates a schematic view of a user interface for safety monitoring functions of a fail-safe counter module in accordance with an exemplary embodiment of the present invention.

FIG. 17 illustrates a schematic view of a user interface 1705 for safety monitoring functions of the fail-safe counter module 1310 in accordance with an exemplary embodiment of the present invention. The user interface 1705 shall be provided in a portal for the configuration of safety functions. The user interface 1705 shall be provided to select and configure "Safety Monitoring" functions. These functions include configuration of the "Measured Values". Note that only 1 of the possible 3 measured values can be returned. However, the following requirements specify the behavior of all 3 selections. The user interface 1705 shall be provided in the portal for the configuration of frequency calculations. The user interface 1705 shall be provided in the portal for the configuration of period calculations. The user interface 1705 shall be provided in the portal for the configuration of velocity calculations. Safety-related parameterization (transfer of safety-related configuration parameters to the module 1310 may be performed by any fail-safe input-output (F-I/O) module.

FIG. 18 illustrates a schematic view of a flow chart of a method 1800 for fail-safe counting in accordance with an exemplary embodiment of the present invention. Reference is made to the elements and features described in FIGS. 1-17. It should be appreciated that some steps are not required to be performed in any particular order, and that some steps are optional.

The method 1800 comprises a step 1805 of providing a controller including a processor and a memory. The method 1800 further comprises a step 1810 of providing circuitry for fail-safe counting. The method 1800 further comprises a step 1815 of providing computer-readable safety rating support code stored in the memory which, when executed by the processor, causes the controller to: provide safety rating to International Standard levels such as Safety Integrity Level (SIL) 3, Category (CAT) 4, Performance Level (PL) e. The method 1800 further comprises a step 1820 of providing computer-readable "Safety Monitoring" functions code stored in the memory which, when executed by the processor, causes the controller to: provide a user interface to select and configure the "Safety Monitoring" functions. The fail-safe counter module is configured as a functional safety-rated device with an expected rating for Safety Integrity Level (SIL) 3, Category (CAT) 4, Performance Level (PL) e applications and is engineered to calculate position and/or speed utilizing an external quadrature encoder sensor that generates waveforms which permits counting of specific electrical pulses.

While a functional safety high-speed fail-safe counter module that is configured for performing fail-safe counting of specific electrical pulses is described here a range of one or more other types of modules or other forms of modules are also contemplated by the present invention. For example, other types of modules may be implemented based on one or more features presented above without deviating from the spirit of the present invention.

The techniques described herein can be particularly useful for particular configuration and programming software of a portal. While particular embodiments are described in terms of specific configuration and programming software of a portal, the techniques described herein are not limited to such a limited configuration and programming software but can also be used with other configurations and programming software.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A fail-safe counter module, comprising:
a controller including a processor and a memory;
circuitry for fail-safe counting;
a Sin/Cos 4-wire differential electrical interface that wires the fail-safe counter module to an external quadrature encoder sensor;
wherein the fail-safe counter module reports events and statuses based on configured parameters and external movement operations in a distributed I/O system;
computer-readable safety rating support code stored in the memory which, when executed by the processor, causes the controller to:
   provide safety rating to International Standard levels such as Safety Integrity Level (SIL) 3, Category (CAT) 4, Performance Level (PL) e; and
computer-readable "Safety Monitoring" functions code stored in the memory which, when executed by the processor, causes the controller to:
   work with a user interface to select and configure the "Safety Monitoring" functions,
   wherein the fail-safe counter module is a functional safety-rated device with an expected rating for Safety Integrity Level (SIL) 3, Category (CAT) 4, Performance Level (PL) e applications and is engineered to calculate position and/or speed utilizing an external quadrature encoder sensor that generates waveforms which permits counting of specific electrical pulses.

2. The fail-safe counter module of claim 1, further comprising:
a safety rated high-speed counter input channel.

3. The fail-safe counter module of claim 1, further comprising:
computer-readable firmware code stored in the memory which, when executed by the processor, causes the controller to:
   provide 32-bit resolution, signed integer representation, and
   count values scaled to engineering units.

4. The fail-safe counter module of claim 1, further comprising:
a Sin/Cos interface.

5. The fail-safe counter module of claim 3, wherein electrical signals from the external quadrature encoder sensor are used to establish high-speed counting which can be used to indicate the position and/or speed.

6. The fail-safe counter module of claim 1, wherein the fail-safe counter module achieves Safety Integrity Level (SIL) 3, Category (CAT) 4, Performance Level (PL) e safety ratings independently without any external dependence upon an application program executing within a safety-rated Programable Logic Controller (PLC).

7. The fail-safe counter module of claim 1, wherein the fail-safe counter module performs separate the "Safety Monitoring" functions internal to the fail-safe counter module as the "Safety Monitoring" functions are independent from any external monitoring dependency from a safety-rated Programable Logic Controller (PLC) such that the "Safety Monitoring" functions are fully performed within the fail-safe counter module which also independently achieves Safety Integrity Level (SIL) 3, Category (CAT) 4, Performance Level (PL) e safety ratings.

8. The fail-safe counter module of claim 1, wherein the "Safety Monitoring" functions include configuration of "Measured Values".

9. The fail-safe counter module of claim 8, wherein the "Measured Values" include a Frequency Measured Value, a Period Measured Value and a Velocity Measured Value.

10. A method for fail-safe counting, the method comprising:
providing a controller including a processor and a memory;
providing circuitry for fail-safe counting;
providing a Sin/Cos 4-wire differential electrical interface that wires the fail-safe counter module to an external quadrature encoder sensor;
wherein the fail-safe counter module reports events and statuses based on configured parameters and external movement operations in a distributed I/O system;
providing computer-readable safety rating support code stored in the memory which, when executed by the processor, causes the controller to:
   provide safety rating to International Standard levels such as Safety Integrity Level (SIL) 3, Category (CAT) 4, Performance Level (PL) e; and
providing computer-readable "Safety Monitoring" functions code stored in the memory which, when executed by the processor, causes the controller to:
   work with a user interface to select and configure the "Safety Monitoring" functions,
   wherein the fail-safe counter module is a functional safety-rated device with an expected rating for Safety Integrity Level (SIL) 3, Category (CAT) 4, Performance Level (PL) e applications and is engineered to calculate position and/or speed utilizing an external quadrature encoder sensor that generates waveforms which permits counting of specific electrical pulses.

11. The method of claim 10, further comprising:
providing a safety rated high-speed counter input channel.

12. The method of claim 10, further comprising:
providing computer-readable firmware code stored in the memory which, when executed by the processor, causes the controller to:
   provide 32-bit resolution, signed integer representation, and
   count values scaled to engineering units.

13. The method of claim 10, further comprising:
providing a Sin/Cos interface.

14. The method of claim 12, wherein electrical signals from the external quadrature encoder sensor are used to establish high-speed counting which can be used to indicate the position and/or speed.

15. The method of claim 10, wherein the fail-safe counter module achieves Safety Integrity Level (SIL) 3, Category (CAT) 4, Performance Level (PL) e safety ratings independently without any external dependence upon an application program executing within a safety-rated Programable Logic Controller (PLC).

16. The method of claim 10, wherein the fail-safe counter module performs separate the "Safety Monitoring" functions internal to the fail-safe counter module as the "Safety Monitoring" functions are independent from any external monitoring dependency from a safety-rated Programable Logic Controller (PLC) such that the "Safety Monitoring" functions are fully performed within the fail-safe counter module which also independently achieves Safety Integrity Level (SIL) 3, Category (CAT) 4, Performance Level (PL) e safety ratings.

17. The method of claim 10, wherein the "Safety Monitoring" functions include configuration of "Measured Values".

18. The method of claim 17, wherein the "Measured Values" include a Frequency Measured Value, a Period Measured Value and a Velocity Measured Value.

\* \* \* \* \*